United States Patent Office 3,305,529
Patented Feb. 21, 1967

3,305,529
POLYMERIZATION OF FORMALDEHYDE IN THE PRESENCE OF A POLYVALENT METAL CHELATE OF A BETA-DIKETONE
Richard E. Reynolds, Midland Park, N.J., assignor, by mesne assignments, to Tenneco Chemicals, Inc., New York, N.Y., a corporation of Delaware
No Drawing. Filed July 9, 1963, Ser. No. 293,843
20 Claims. (Cl. 260—67)

This invention relates to the polymerization of formaldehyde and, more particularly, to the production of high molecular weight polymers of formaldehyde. The invention is based on the discovery that the polyvalent metal chelates of certain β-diketones are unusually effective formaldehyde polymerization initiators and, moreover, appear to influence the molecular configuration of the resultant polymer by introducing branched chains at one or more points in the main polymer chain. The invention provides an improved process for the production of high molecular weight polymers of formaldehyde and also provides a new class of high molecular weight branched chain polyoxymethylene polyols and their corresponding polyacetates which are characterized, upon acid hydrolysis, by the presence of minute quantities of a β-diketone.

Recent advances in polymer process technology have made commercially available the high molecular weight polymers of formaldehyde. These polyacetals, which include both the homopolymers and copolymers of formaldehyde, are thermoplastic resins which, upon stabilization, may be fabricated into films, filaments, fibers, rods and tubes. Because of the inherent instability of unstabilized polyacetals (such as polyoxymethylene glycol or polyols) to oxidative or hydrolytic cleavage of the polymer chains or to thermal degradation, generally the raw "uncapped" polymers require stabilization, either by the further reaction of an "uncapped" polymer by acylation, etherification, cyanoethylation, or cross-linking to block the "uncapped" hydroxy groups, by controlled degradation of the polymer chain until an end-group is reached which is inert to further chemical or physical degradation, by the incorporation in the polymer composition of a stabilizer or stabilizer systems which promote the stabilization of the polymer against oxidative, hydrolytic or thermal degradation, or by employing a combination of these techniques.

The stability of these high molecular weight polymers of formaldehyde has been found to be dependent, among other things, on the molecular weight range, the molecular weight distribution, and the molecular configuration of the polymer. In turn, the molecular weight range of formaldehyde polymers is dependent upon many process variables, one of the most important of which is the formaldehyde polymerization initiator employed during the polymerization.

The present invention is based upon the discovery that polyvalent metal chelates of certain β-diketones are unusually effective formaldehyde polymerization initiators for the production of polymers of formaldehyde having a molecular weight in the range between about 5,000 to about 300,000, the particular molecular weight range being dependent upon the concentration and nature of the polyvalent metal chelate employed during the polymerization. Structurally, these polyvalent metal chelates may be represented by the formula

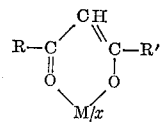

in which R and R' each represent a radical selected from the group consisting of lower alkyl groups, haloalkyl groups, aryl groups, aralkyl groups, and heterocyclic groups, M is a polyvalent metal, and x is an integer representing the valence of the polyvalent metal. Evidence has been obtained that appears to indicate that these polyvalent metal chelates influence the molecular configuration of the resultant polymer by introducing branched chains at one or more points in the main polymer chain, particularly when these polyvalent metal chelates are employed in certain reaction mediums.

Only relatively small concentrations of these polyvalent metal chelates are required in the polymerization medium, for concentrations as low as 0.01 percent by weight (based on the monomer introduced into the reaction medium) are effective, although higher concentrations (up to about 50 percent by weight) of these formaldehyde polymerization initiators may be employed to produce high molecular weight polymers of formaldehyde in accordance with the invention.

As used herein, the term "high molecular weight polymer of formaldehyde" includes both linear and branched-chain homopolymers and copolymers of formaldehyde having a molecular weight in the range from about 10,000 to about 300,000 and a melting point which is generally in excess of 170° C., the predominant structural feature of both homopolymers and copolymers being the recurring oxymethylene units (—OCH$_2$—) in the polymer chain. Among the most important homopolymers are α,ω-polyoxymethylene glycol, α,ω-polyoxymethylene dicarboxylates (such as the diacetate or dipropionate), and α,ω-polyoxymethylene diethers (such as the methyl, ethyl, or β-hydroxyethyl ethers), all of which may have ω-substituted-polyoxymethylene branched chains at one or more points in the main polymer chain. The formaldehyde copolymers include both linear and branched chain polymers in which the recurring oxymethylene units (—OCH$_2$—)

in the polymer chains are periodically or randomly interrupted by other oxyalkylene units containing two or more vicinal carbon atoms, or by other units introduced by copolymerizing other monomers, such as γ-butyrolactone, phthalide or isocyanic acid, with substantially anhydrous formaldehyde or with its trimer, trioxane. The term "process for producing a high molecular weight polymer of formaldehyde" embraces any such process in which substantially anhydrous monomeric formaldehyde or trioxane is polymerized (or copolymerized) by bringing the monomer into contact with the formaldehyde polymerization initiators of the invention, using an organic reaction medium at a temperature in the range from about —100° C. to about 80° C.

Accordingly, the invention provides an improved process for producing high molecular weight polymers of formaldehyde which comprises polymerizing substantially anhydrous monomeric formaldehyde by bringing the monomer into contact with a reaction medium maintained at a temperature within the range from about —100° C. to about 80° C. and containing a formaldehyde polymerization initiator comprising from about 0.01 to about 50 percent by weight, based on the weight of the monomeric formaldehyde, of a polyvalent metal chelate of a β-diketone having a structure represented by the formula

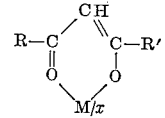

in which R and R' each represent a radical selected from the group consisting of lower alkyl groups, haloalkyl groups, aryl groups, aralkyl groups, and heterocyclic groups, M is a polyvalent metal, and $x$ is an integer representing the valence of the polyvalent metal.

Among the polyvalent metal chelates of $\beta$-diketones which have been used in the process of the invention are chelates prepared from iron, copper, zinc, aluminum, cobalt, chromium, cadmium, molybdenum, lead, magnesium, manganese, beryllium, nickel, thorium, indium, vanadium, titanium and zirconium, the preferred chelates being prepared from those divalent and trivalent metals which form colorless or lightly colored chelates with the $\beta$-diketone. Particularly satisfactory results have been obtained using the ferrous, ferric and zinc chelates.

The $\beta$-diketones used to prepare the formaldehyde polymerization initiators of the invention are structurally represented by the formula

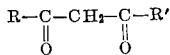

in which R and R' are the substituents hereinbefore specified. Illustrative of these $\beta$-diketones are acetylacetone (2,4-pentanedione), trifluoroacetylacetone, hexafluoroacetylacetone, benzoylacetone, dibenzoyl methane, benzoyltrifluoroacetone, 2-thenoylacetone, di-2-thenoyl methane, 2-thenoyltrichloroacetone, 2-thenoylbenzoyl methane, 2-furoylacetone, 2-furoylbenzoyl methane, 2-furoyltrifluoroacetone, 2-furoyl-2-thenoyl methane and 2-thenoyltrifluoroacetone.

To function most effectively as formaldehyde polymerization initiators, the polyvalent metal chelates of $\beta$-diketones should be soluble either in the reaction medium, one of the components of the reaction medium or in a solvent which, in turn, is compatible with the reaction medium. As indicated previously, the concentration of the polyvalent metal chelate used in the polymerization does not appear to be especially critical, for concentrations ranging from about 0.01 to about 50 percent by weight (based on the weight of formaldehyde introduced into the reaction medium) may be employed. Excellent results may be obtained by using the polyvalent metal chelate at concentration in the range between about 0.1 to about 5 percent by weight, based on the weight of the formaldehyde introduced into the reaction medium.

The polymerization reaction may be conducted either in the vapor phase or in a substantially anhydrous organic reaction medium which remains liquid under the polymerization conditions and which is a non-solvent for the polymer at the polymerization temperatures. Suitable reaction media include hydrocarbons, such as propane, hexane, decane, cyclohexane, benzene, toluene, xylene, and decahydronaphthalene; halogenated hydrocarbons, such as methylene dichloride, chloroform, and chlorobenzenes; ethers, such as diethyl ether, dibutyl ether, dioxane, and tetrahydrofuran. Outstanding results have been obtained using the solvent systems and polymerization conditions described in the copending application of Henri Sidi, Serial No. 133,783, filed August 25, 1961, now United States Letters Patent No. 3,219,630, which describes the polymerization of monomeric formaldehyde in the presence of a formaldehyde polymerization initiator at a temperature in the range from about 10° C. to about 60° C. in a liquid organic reaction medium comprising an alkylene dicarboxylate having a structure represented by the formula

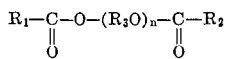

in which $R_1$ and $R_2$ each represent a monovalent radical selected from the group consisting of alkyl groups containing from 1 to 17 carbon atoms, cycloalkyl groups, and mononuclear and binuclear aryl groups, $R_3$ represent a divalent radical selected from the group consisting of —$CH_2$— and

and $n$ represents an integer from 1 to 3. Illustrative of such alkylene dicarboxylates are methylene diacetate, methylene dipropionate, methylene dibutyrate, methylene acetate propionate, and the low molecular weight polymeric analogs of these dicarboxylates. In general, the amount of the reaction medium used in the polymerization reaction may vary from 1 to 1000, and preferably from 1 to 100 times the weight of the monomeric formaldehyde introduced into the reaction medium.

The polymerization reaction may be conducted by introducing substantially anhydrous monomeric formaldehyde into a reaction medium containing the formaldehyde polymerization initiator. Alternatively, monomeric formaldehyde can be introduced continuously into a reactor containing the reaction medium (less initiator) while at the same time the formaldehyde polymerization initiator is added at such rate that the temperature is maintained within the range selected for the reaction. When the polymerization is complete, the resultant polyoxymethylene polyol may be recovered and stabilized by acylation, etherification, or other known methods.

The polymerization reaction should be conducted under non-oxidizing conditions, preferably by conducting the reaction under a blanket of an inert gas, such as nitrogen. In addition, antioxidant may be present in the reaction medium and/or may be added to the product to reduce oxidative effects. Among the antioxidants which may be used for this purpose are phenothiazine, 2-mercaptobenzimidazole, diphenylamine, phenyl-$\alpha$-naphthylamine, bis-($\beta$-naphthylamine)-p-phenylene diamine, 4,4'-butylidene-bis-(3-methyl-6-t-butylphenol), and 5-ethyl-10,10-diphenylphenazasiline. When used, the amount of antioxidant used is between approximtaely 0.01 percent and about 1 percent by weight, based on the weight of formaldehyde introduced into the reaction medium.

Frequently, it is also useful to employ a small amount of a chain transfer agent in the reaction medium, which may be added before or during the polymerization reaction. Suitable chain transfer agents include aliphatic alcohols, such as methanol, ethanol, and cyclohexanol; aliphatic acids and acid anhydrides, such as formic acid, acetic acid, butyric acid, acetic anhydride, and propionic anhydride; aromatic acids, such as benzoic acid and toluic acid; and esters, such as methyl acetate, methyl propionate, ethyl formate, and ethyl acetate; and the saturated aliphatic dicarboxylic acids and their lower alkyl esters, such as oxalic acid and diethyl oxalate, and mixtures thereof, the effectiveness of which is described in the copending application of Harry Yakimik, Serial No. 275,513, filed April 25, 1963, now United States Letters Patent No. 3,275,603.

In a preferred embodiment of the invention, the polyvalent metal chelate polymerization initiators are used in an integrated process in which substantially anhydrous monomeric formaldehyde is converted to high molecular weight polyoxymethylene polycarboxylates without the isolation or purification of an intermediate product. In this process, the monomeric formaldehyde is introduced into a reaction medium comprising an alkylene dicarboxylate in which there is dissolved the polyvalent metal chelate, where it undergoes polymerization to form a partially esterified polyoxymethylene polyol suspended in the reaction medium; heating of the suspension to a temperature in the range between 140° C. and 200° C. with a catalytic amount of of an alkaline esterification catalyst completes the esterification of the polymer.

The esterification reaction between the partially esterified polyoxymethylene polyol and the alkylene dicarboxylate is generally carried out in the presence of a catalytic amount of an alkaline esterification catalyst which preferably is an alkali metal salt of an acid having a dissociation constant of less than $1.8 \times 10^{-4}$ at 25° C. These salts include, for example, sodium formate, sodium acetate, sodium laurate, sodium stearate, sodium benzoate, sodium salicylate, sodium carbonate, disodium phosphate, lithium acetate, lithium benzoate, potassium formate, potassium salicylate, potassium carbonate, and the like. The amount of the alkaline esterification catalyst which is used is ordinarily in the range of from about 0.001 to about 1 percent, and preferably from 0.01 to 0.1 percent by weight, based on the weight of the alkylene dicarboxylate.

Optimum yields of the esterified polymer (which is a branched chain polyoxymethylene polycarboxylate) are obtained when the esterification is conducted in the alkylene dicarboxylate reaction medium to which has been added (upon completion of the polymerization reaction) an anhydride of a monocarboxylic acid, preferably of the same carboxylic acid from which the alkylene dicarboxylate is derived.

Upon completion of the esterification of the partially esterified polyoxymethylene polyol (which dissolves at reflux in the alkylene dicarboxylate), the solution of polyoxymethylene polycarboxylate in the alkylene dicarboxylate should be cooled slowly and at a uniform rate from the temperature at which the esterification was carried out to a temperature below that at which solid polymer first appears, that is, approximately 120° C. to 130° C., thereby crystallizing the product in the form of powder or small crystals. This cooling is preferably carried out at the rate of approximately 5° to 15° C. and preferably 7° to 10° C. per hour, for cooling the solution more rapidly results in agglomeration of the crystals of polyoxymethylenepolycarboxylate and caking on the walls of the reactor. At temperatures below 120° C. the rate at which the reaction mixture is cooled is not critical, and the cooling to ambient temperature can be carried out at a faster rate without affecting the physical characteristics of the product. The solid polyoxymethylene polycarboxylate which crystallizes when the reaction mixture is cooled may then be separated from the reaction medium by filtration or centrifuging.

The use of polyvalent metal chelates of β-diketones as formaldehyde polymerization initiators, particularly in reaction mediums containing alkylene dicarboxylates, appears to influence the molecular configuration of the resultant polymer by introducing branched chains at one or more points in the main polymer chain. For example, when substantially anhydrous monomeric formaldehyde is polymerized by contacting the monomer with a reaction medium comprising methylene diacetate in which there is dissolved a polyvalent metal acetylacetonate, and the resultant partially acetylated polymer is "capped" with acetic anhydride to form a polyoxymethylene polyacetate, viscometric determination of the molecular weight yields values which are higher than the molecular weights computed from the infrared absorption in the carbonyl region, assuming the polymer to be linear and hence an α,ω-diacetate. Thus, if there are more than two acetate groups per molecule, then the molecular weight which is computed from infrared absorption should be lower than the viscosimetrically determined molecular weight for the same polymer. It appears from all experiments to date that the polyoxymethylene polycarboxylates produced in accordance with the process of the invention contain from 1 to 3 branches per polymer molecule, although this data is not conclusive. The degree of branching of the polymer may be related to its Sidi Number which is defined by the formula $S_N = \overline{M}_V / \overline{M}_{IR}$, where $S_N$ represents the Sidi Number, $\overline{M}_V$ represents the viscosimetrically determined apparent molecular weight of the polymer, and $\overline{M}_{IR}$ represents the IR-spectrophotometrically determined molecular weight of the polymer calculated from the intensity of the carbonyl absorption band of the infrared absorption spectrum of the polymer and assuming for the purpose of such calculation that the intensity of such carbonyl absorption band is due to the presence of two carboxylate groups per molecule. The polymers of the invention may be characterized by a Sidi Number not less than 1.5 (1 branch) and generally in the range from 1.5 to 3. Comparable molecular weight determinations on a commercially available polyoxymethylene diacetate have confirmed that this commercially available product is linear and contains only two acetate groups per molecule; consequently, its Sidi Number is 1.0.

Acid hydrolysis of these branched chain polyoxymethylene polycarboxylates (or the polyoxymethylene polyol from which they are prepared) indicates the presence of small amounts (generally less than 1 percent by weight) of a β-diketone, the polyvalent chelate of which was used as the formaldehyde polymerization catalyst. The presence of the β-diketone in the acid hydrolysate may be demonstrated by the formation of a ferric β-diketone chelate which possesses a characteristic color, the intensity of which is a measure of the concentration of the β-diketone. The amount of the β-diketone which is present upon acid hydrolysis of the polymer is, of course, dependent upon the amount of the polyvalent metal chelate employed to initiate polymerization.

Accordingly, the invention also contemplates a new class of high molecular weight branched chain polyoxymethylene polyols and the corresponding polycarboxylates, both of which are characterized (a) by a Sidi Number not less than 1.5 when computed in accordance with the formula $S_N = \overline{M}_V / \overline{M}_{IR}$, where $S_N$ represents the Sidi Number, $\overline{M}_V$ represents the viscosimetrically determined apparent molecular weight of the polymer, and $\overline{M}_{IR}$ represents the IR-spectrophotometrically determined molecular weight of the polymer calculated from the intensity of the carbonyl absorption band of the infrared absorption spectrum of the polymer and assuming for the purposes of such calculation that the intensity of such carbonyl absorption band is due to the presence of two carboxylate groups per molecule, and (b) upon acid hydrolysis, by the presence of less than 1 percent by weight of a β-diketone having a structure represented by the formula

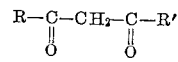

in which R and R' each represent a radical selected from the groups consisting of lower alkyl groups, haloalkyl groups, aryl groups, aralkyl groups, and heterocyclic groups. These new polymers generally have viscosimetrically determined molecular weights in the range between about 10,000 to about 300,000, the most commercially important being the polymethylene polyacetates having viscosimetrically determined molecular weights in the range between about 15,000 to about 60,000.

To compute the Sidi Number, which is an indication of the extent of branching in the polymer, the molecular weight of the polymer must be determined by viscosimetric techniques and then by end-group analysis using the infrared method. Determination of the apparent molecular weight ($\overline{M}_V$) of the polymer by the viscosimetric technique may be conducted (a) by osmometry in phenol solutions at 90° C., preferably using the method described by Koch and Lindvig, Journal of Applied Polymer Science, 1, 164 (1959), or (b) by osmometry in dimethylformamide solutions at 150° C. using 0.5 g. of polymer per 100 ml. of dimethylformamide and for which the constants for the equation $\eta = KM^a$ have been found to be $K = 9.72 \times 10^{-4}$ and $a = 0.626$.

Determination of the calculated molecular weight ($\overline{M}_{IR}$) of the polymer requires analysis of its infrared spectrum. The infrared spectrum of a pressed film of polyoxymethylene diacetate shows carbonyl absorption at 5.69μ. A film of suitable thickness may be prepared by cold pressing 20 mg. of the powdered polymer in a die used to prepare 0.5 inch KBr pellets, while films of extruded pellets can be prepared at 180° C. to 200° C. by pressing between microscope cover glasses on a hot stage. Because of the difficulty of precisely duplicating the thickness of pressed films, however, the absorption of the carbonyl band may be expressed as a ratio of the $-OCH_2-$ band at $2.54\mu$. As used herein, the values for $\overline{M}_{IR}$ for polyoxymethylene polyacetates have been calculated from the equation $$\overline{M}_{IR} = \frac{5.18 \times 10^4}{R}$$

where $\overline{M}_{IR}$ = Calculated molecular weight of the polymer; and
$R$ = The ratio of the intensity of the carbonyl absorption band (at $5.69\mu$) to the intensity of the oxymethylene absorption band (at $2.54\mu$) in the infrared spectrum of the polymer, which relationship has been empirically determined by infrared analyses of samples of linear $\alpha,\omega$-polyoxymethylene diacetates of known structures, and has been further verified by chemical analyses of these samples of known structure. Since this relationship is based on the presence of only two acetate groups per molecule, the calculation of $\overline{M}_{IR}$ of the polyoxymethylene polyacetates for the purpose of computing the Sidi Number is also based on the assumption that the polymer contains only two acetate groups per molecule. Because the branched chain polyoxymethylene polyacetates of the invention contain at least 3 acetate groups per molecule, the value for $\overline{M}_{IR}$ will always be lower than the value for $\overline{M}_V$ for a branched chain polyoxymethylene polyacetate, while the values for $\overline{M}_{IR}$ and $\overline{M}_V$ will be substantially in agreement in a linear $\alpha,\omega$-polyoxymethylene diacetate.

The commercial usefulness of these polymers is largely dependent upon such factors as their molecular weight range and distribution, apparent viscosity and thermal stability. Although any one of these properties may be roughly related to the molding characteristics of the polymer, it is frequently necessary to measure all of the aforementioned properties or to actually process the polymer in molding apparatus in order to evaluate it as a commercial resin. A summation of these effects can be obtained, however, by determining the melt viscosity characteristics of the polymer under typical processing conditions of temperature, rate of shear, and shearing force. While a number of instruments are capable of furnishing useful melt viscosity data, the Brabender Plasti-corder (C. W. Brabender Instruments, Inc.) is particularly valuable for this purpose because it provides flow data obtained under dynamic test conditions and therefore closely simulates behavior typical of that expected during processing. In addition the Plasti-corder provides information on the thermal stability of the polymer under conditions equivalent to those encountered during processing.

Essentially, the Brabender Plasti-corder is a laboratory Banbury mixer with a variable speed dynamometer drive that records continuously changes in polymer melt viscosity at a given temperature. As a polymeric material is plasticized by heating and by the working of the rotor blades, a graph is produced continuously that records the torque (in meter grams) on the motor housing (a measure of the power involved in fluxing the resin) as a function of shear rate and temperature.

The melt flow characteristics of the branched chain polyoxymethylene polycarboxylates of the invention can be obtained by the following procedure: To 45 grams of powdered polyoxymethylene polycarboxylate are added 0.675 gram of a terpolymer of approximately 38% polycaprolactam/35% polyhexamethylene adipamide/27% polyhexamethylene sebacamide, 0.135 gram of 4,4'-butylidene-bis-(3-methyl-6-t-butylphenol), and 0.045 gram of dilauryl 3,3'-thiodipropionate. This mixture of polymer and stabilizer components is introduced rapidly into the chamber of the Brabender Plasti-corder. The chamber is maintained at 220° C. during the addition of the mixture and throughout the melt viscosity test. The material is fluxed for 7 minutes at a rotor speed of 63 r.p.m. and then for 30 second intervals at speeds of 50 r.p.m., 40 r.p.m., 30 r.p.m., and 20 r.p.m., respectively. The rotor speed is then returned to 63 r.p.m. for 30 seconds. After a 30-second period at 70 r.p.m., the rotor speed is increased by 10 r.p.m. increments at 30-second intervals until it has reached 150 r.p.m. The test material is then fluxed at 63 r.p.m. for 15 minutes.

From the graph that is produced during the 30-minute test period various values may be obtained which can be combined to give a profile of the polymer, from which, in turn, its suitability for use in injection molding and extrusion apparatus can be determined. Among these values are the following:

(1) *Degradation slope.*—The degradation slope is the slope of the line obtained by plotting the logarithms of the torque readings taken during the initial seven minute period of the cycle against time. Since polyoxymethylene polycarboxylates having high molecular weights generally degrade more rapidly when fluxed at high temperatures than do those having lower molecular weights, the molecular weight of the polymer can be estimated from its degradation slope.

(2) *Shear slope.*—This slope, which is a measure of the sensitivity of the polymer to shear, can be used to provide qualitative data on the molecular weight distribution of the polymer, with larger values indicating greater uniformity in chain length at the same average molecular weight. For polyoxymethylene polycarboxylates it has been found that the optimum shear slope for a polymer having an average molecular weight of approximately 30,000 as in the range of 4 to 7, whereas for a polymer having an average molecular weight of approximately 50,000 it is in the range of 10 to 20.

The shear slope is the slope of the line obtained by plotting against time the logarithms of the torque measurements taken during the period in which the rate of rotation of the rotors was varied from 63 r.p.m. to 20 r.p.m.

(3) *Rotor speed at which torque reaches a maximum value.*—When the rate of rotation of the rotors is increased from 63 r.p.m. to 150 r.p.m., the torque of stable polymers increases at a regular rate. When materials that are sensitive to shear are used in the Brabender Plasti-corder test, degradation takes place as the rate of rotation is increased. There is a resulting decrease in the torque of the molten polymer which may equal or surpass the rate at which the torque is increased as the result of increasing shear force. The rotor speed at which the torque reaches a maximum value is recorded. Polyoxymethylene polycarboxylates that have excellent stability when subjected to increasing shear force and accordingly have good extrusion properties do not reach a maximum torque value at a rate of rotation below 80 r.p.m. Preferably they do not reach a maximum torque value at a rate of rotation below 150 r.p.m.

(4) *Percent loss in torque on shear.*—This value is a measure of the sensitivity of the polymer to degradation caused by shear. It is calculated from the difference between the torque of the molten resin at 63 r.p.m. after the initial seven minute fluxing period and that of the resin at 63 r.p.m. after the rotor speed has been varied from 63 r.p.m. to 20 r.p.m. and to 150 r.p.m. as hereinbefore described.

(5) *Final torque.*—The final portion of the graph indicates the thermal stability of the molten resin under dynamic conditions. In a stable polymer there will be little or no change in torque during the last 15 minutes of the test. The torque of the molten resin at the conclusion of the test should be in the range of 200 to 800 meter grams and preferably in the range of 350 to 600 meter grams if the resin is to be fabricated in injection molding or extrusion equipment.

The thermal stability of the polymers may be determined by measuring the weight loss of a one gram sample of the product which has been heated at 222° C. for one hour. The branched chain polyoxymethylene polycarboxylates prepared by the process of this invention have a thermal degradation rate at this temperature of less than 10 percent by weight per hour.

The followng examples are illustrative of the effectiveness with which polyvalent metal chelates of β-diketones may be used as formaldehyde polymerization initiators in accordance with the invention:

EXAMPLE I

Anhydrous monomeric formaldehyde, which was prepared by adding 100 grams of α-polyoxymethylene over a period of 60 minutes to a stirred solution of 2 ml. of phosphoric acid in 750 grams of the diethyl ether of diethylene glycol maintained at a temperature in the range between 140° C. and 160° C. and the formaldehyde vapors from this pyrolysis then passed through two traps, the first of which was maintained at 0° C. and the second at −20° C., was introduced into a reactor which was blanketed with dry nitrogen and which contained 1000 grams of methylene diacetate, a solution of 0.1 gram of ferric acetylacetonate in 5 ml. of toluene, and 0.1 gram of 4,4'-butylidene-bis-(3-methyl-6-t-butylphenol). The monomeric formaldehyde was added to the reaction medium over a period of 50 minutes, during which time the reaction mixture was stirred and maintained at a temperature in the range between 21° C. and 32.5° C. When all of the formaldehyde had been added, 10 grams of acetic anhydride and 0.4 gram of sodium acetate were added to the reaction mixture, which was then stirred and heated gradually to its reflux temperature (164°–167° C.) and maintained at that temperature for two hours to acetylate the polymer. At the end of this time, the solution of the acetylated polymer (which subsequently was identified as a branched chain polyoxymethylene polyacetate) was cooled to 125° C. at the rate of from 7° to 8° C. per hour and then more rapidly to ambient temperature. Following filtration, the resultant polyoxymethylene polyacetate was washed with 500 ml. of acetone, with two 500 ml. portions of water, and finally with two 500 ml. portions of acetone, the second of which contained 0.1 gram of 4,4'-butylidene-bis-(3-methyl-6-t-butylphenol). After drying under vacuum to constant weight, there was obtained 34 grams of a branched chain polyoxymethylene polyacetate having a molecular weight of 45,000, as determined viscosimetrically.

EXAMPLE II

Anhydrous monomeric formaldehyde obtained by the pyrolysis of 200 grams of α-polyoxymethylene by the procedure described in Example I was introduced into a reaction medium which contained 2000 grams of methylene diacetate, a solution of 0.2 gram of ferric acetylacetonate in 10 ml. of toluene, and 15 grams of diethyl oxalate. The formaldehyde was added over a period of 50 minutes, during which time the reaction mixture was stirred and maintained at a temperature between 24° C. and 30° C. When all of the formaldehyde had been added to the reaction medium, 20 grams of acetic anhydride, 0.8 gram of sodium acetate, and 0.4 gram of 4,4'-butylidene-bis-(3-methyl-6-t-butylphenol) were added to the reaction mixture, and the resultant mixture was stirred and heated gradually to its reflux temperature (164°–168° C.) and maintained at such temperature for one hour. At the end of this time, the mixture was cooled to 125° C. at the rate of from 7° to 10° C. per hour and then more rapidly to ambient temperature. Following filtration, the resultant acetylated polymer was washed and dried by the procedure described in Example I, yielding 120 grams of a branched chain polyoxymethylene polyacetate having an average molecular weight of approximately 30,000, as determined viscosimetrically.

A sample of this product was then evaluated in the Brabender Plasti-corder by the procedure previously described, and was found to have a degradation slope of 0.8, a shear slope of 6.5, the rotor speed at which torque reached a maximum value was greater than 150 r.p.m., the percent loss of torque due to shear was 6.2 percent, and the final torque was 600 meter grams, which data confirmed that the polymer possessed excellent melt flow characteristics and good resistance to shear degradation and to thermal degradation.

EXAMPLE III

Anhydrous monomeric formaldehyde, which was prepared by the pyrolysis of 100 grams of α-polyoxymethylene by the procedure described in Example I, was introduced into a reaction medium consisting of 1000 grams of methylene diacetate, a solution of 0.1 gram of ferrous acetylacetonate in 5 ml. of toluene, and 0.1 gram of 4,4'-butylidene-bis-(3-methyl-6-t-butylphenol), over a period of 50 minutes, during which time the reaction mixture was stirred and maintained at a temperature between 22° C. and 35° C. After all of the formaldehyde had been introduced into the reaction mixture 10 grams of acetic anhydride and 0.4 gram of sodium acetate were added to the reaction mixture, and the resultant mixture was stirred and heated gradually to its reflux temperature (164°–167° C.), maintained at that temperature for one hour, and then cooled slowly to ambient temperature. Following filtration, the resultant polymer was washed and dried by the procedure described in Example I, yielding 42 grams of a branched chain polyoxymethylene polyacetate which had a molecular weight of 47,000, as determined viscosimetrically.

EXAMPLE IV

Anhydrous monomeric formaldehyde, prepared by the pyrolysis of 100 grams of α-polyoxymethylene by the method described in Example I, was introduced into a reactor to which had been added 1000 grams of methylene diacetate, a solution of 0.1 gram of aluminum acetylacetonate in 5 ml. of toluene, and 0.1 gram of 4,4'-buytlidene-bis-(3-methyl-6-t-butylphenol). Addition of the formaldehyde required a period of 50 minutes, during which time the reaction mixture was stirred and maintained at temperatures between 20° C. and 38° C. Following the addition of the formaldehyde, 10 grams of acetic anhydride and 0.4 gram of sodium acetate were added to the reaction mixture, which was then stirred and heated gradually to its reflux temperature (164°–167° C.), maintained at that temperature for one hour, and cooled slowly to ambient temperature. Following filtration, the acetylated polymer was washed and dried by the procedure described in Example I, yielding 24 grams of a branched chain polyoxymethylene polyacetate which had a molecular weight of approximately 10,000.

EXAMPLE V

Anhydrous monomeric formaldehyde, prepared by the pyrolysis of 100 grams of α-polyoxymethylene by the procedure described in Example I, was introduced into a reaction medium consisting of 1000 grams of methylene diacetate, a solution of 0.1 gram of manganic acetylacetonate in 5 ml. of toluene, and 0.1 gram of 4,4'-butylidene-bis-(3-methyl-6-t-butylphenol), over a period of 50 minutes, during which time the reaction mixture was stirred and maintained at a temperature in the range between 21° C. and 32° C. When all of the formaldehyde had been introduced into the reaction mixture, 10 grams of acetic anhydride, 0.4 gram of sodium acetate, and 300 grams of methylene diacetate were added to the reaction mixture, which was then stirred and heated gradually to its reflux temperature, maintained at that temperature for one hour, and cooled slowly to ambient temperature. Following filtration, the acetylated polymer was washed and dried by the procedure described in Example I, yielding 43.5 grams of a branched chain polyoxymethylene polyacetate having a molecular weight of 190,000.

EXAMPLE VI

Anhydrous monomeric formaldehyde, obtained by the pyrolysis of 100 grams of α-polyoxymethylene by the procedure described in Example I, was introduced into a reactor to which had been added 1000 grams of methylene diacetate, a solution of 0.1 gram of cobaltic acetylacetonate in 5 ml. of toluene, and 0.1 gram of 4,4'-butylidene-bis-(3-methyl-6-t-butylphenol). The formaldehyde was added over a period of 50 minutes, during which time the reaction mixture was stirred and maintained between 20° C. and 24° C. Following the addition of all of the formaldehyde to the reaction mixture, 10 grams of acetic anhydride and 0.4 gram of sodium acetate were added, and the resultant slurry was stirred and heated gradually to its reflux temperature, maintained at that temperature for one hour, and then cooled slowly to ambient temperature. After filtration of the polymer from the reaction mixture, it was washed and dried by the procedure described in Example I, yielding 19.1 grams of a branched chain polyoxymethylene polyacetate which had a molecular weight of 27,000, as determined viscosimetrically.

EXAMPLE VII

The procedure described in Example VI was repeated using identical reaction conditions except chromium acetylacetonate as the polymerization initiator in place of cobaltic acetylacetonate. There was obtained 10.6 grams of a branched chain polyoxymethylene polyacetate which had a molecular weight of approximately 10,000.

EXAMPLE VIII

Anhydrous monomeric formaldehyde, obtained by the pyrolysis of 200 grams of α-polyoxymethylene by the procedure described in Example I, was introduced into a reactor to which had been added 2000 grams of methylene diacetate and a solution of 0.148 gram of zinc acetylacetonate in 7.4 ml. of toluene. The formaldehyde was added over a period of 35 minutes, during which time the reaction mixture was stirred and maintained at a temperature of 27° C. to 33° C. After all of the formaldehyde had been added to the reaction mixture, 20 grams of acetic anhydride, 0.8 gram of sodium acetate, and 0.4 gram of 4,4'-butylidene-bis-(3-methyl-6-t-butylphenol) were added to the reaction mixture, which was then stirred and heated gradually to its reflux temperature, maintained at that temperature for one hour, and cooled slowly to ambient temperature. Following filtration, the product was washed and dried by the procedure described in Example I. There was obtained 86.7 grams of a branched chain polyoxymethylene polyacetate which had a molecular weight of 62,500.

A sample of this acetylated polymer was evaluated in the Brabender Plastic-corder by the technique previously described. Using the graph obtained during this test, the product was determined to have a degradation slope of 7.2, a shear slope of 10.8, the rotor speed at which torque reaches a maximum value was 80 r.p.m., the percent loss of torque due to shear was 66 percent, and the final torque was 440 meter grams, demonstrating the excellent flow characteristics of the polymer.

EXAMPLE IX

Anhydrous monomeric formaldehyde, which was obtained by the pyrolysis of 200 grams of α-polyoxymethylene by the procedure described in Example I, was introduced into a reaction medium consisting of 2000 grams of methylene diacetate, 0.2 gram of zinc acetylacetonate in 10 ml. of toluene, and 20 grams of diethyl oxalate, over a period of 50 minutes, during which time the reaction mixture was stirred and maintained at a temperature between 24° C. and 35° C. When all of the formaldehyde had been introduced into the reaction mixture, 20 grams of acetic anhydride and 0.4 gram of sodium acetate were added to the reaction mixture, which was stirred and heated gradually to its reflux temperature, maintained at that temperature for one hour, and then cooled slowly to ambient temperature. Following filtration, the product was washed and dried by the procedure described in Example I, yielding 86.9 grams of a branched chain polyoxymethylene polyacetate which had a molecular weight of approximately 50,000, as determined viscosimetrically.

EXAMPLE X

Anhydrous monomeric formaldehyde, obtained by the pyrolysis of 200 grams of α-polyoxymethylene by the procedure described in Example I, was introduced into a reactor which contained 2000 grams of methylene diacetate, 0.2 gram of zinc acetylacetonate in 10 ml. of toluene, and 10 grams of diethyl oxalate. The formaldehyde was added over a period of 50 minutes, during which time the reaction mixture was stirred and maintained at 25° C. to 30° C. After all of the formaldehyde had been added, 20 grams of acetic anhydride, 0.4 gram of sodium acetate, and 0.2 gram of 4,4'-butylidene-bis-(3-methyl-6-t-butylphenol) were added to the reaction mixture, and the resultant mixture was then stirred and heated gradually to its reflux temperature, maintained at that temperature for one hour, and cooled slowly to ambient temperature. Following filtration, the product was washed and dried by the procedure of Example I, yielding 82 grams of a branched chain polyoxymethylene polyacetate which had a molecular weight (determined viscosimetrically) of approximately 50,000.

EXAMPLE XI

Anhydrous monomeric formaldehyde, obtained by the pyrolysis of 200 grams of α-polyoxymethylene by the procedure described in Example I, was introduced into a reactor which contained 2000 grams of methylene diacetate and 0.148 gram of titanyl acetylacetonate in 7.4 ml. of toluene. The formaldehyde was added over a period of 50 minutes, during which time the reaction mixture was stirred and maintained at 25° C. to 30° C. After filtration, there was obtained 183 grams of a high molecular weight branched chain polyoxymethylene polyol.

EXAMPLE XII

Anhydrous monomeric formaldehyde, obtained by the pyrolysis of 200 grams of α-polyoxymethylene by the procedure described in Example I, was introduced into a reactor to which had been added 2000 grams of methylene diacetate, solution of 0.276 gram of zirconium acetylacetonate in 10 ml. of toluene, and 15 ml. of diethyl oxalate. The formaldehyde was added over a period of 115 minutes, during which time the reaction mixture was stirred and maintained at a temperature in the range between 26° C. and 29° C. After all of the formaldehyde had been added, 20 grams of acetic anhydride and 0.8 gram of sodium acetate were added to the reaction mixture, which was then stirred and heated gradually to its reflux temperature (161°–166° C.), maintained at that temperature for one hour, and cooled slowly to ambient temperature. Following filtration, the product was washed and dried by the procedure described in Example I, yielding 113.5 grams of a branched chain polyoxymethylene polyacetate which had a molecular weight of 21,000, as determined viscosimetrically.

In each of the foregoing examples, in which a polyvalent metal acetylacetonate was used as the formaldehyde polymerization initiator, the residues remaining after acid hydrolysis of the branched chain polyoxymethylene polyacetates were found to contain from about 25 to about 400 parts per million of acetylacetone (2,4-pentanedione). Moreover, the ratio of the viscosimetrically determined molecular weight to the molecular weight which is computed from the infrared absorption in the carbonyl region of the polymer was always larger than unity, indicating the existence of branch chains on the main polymer chain.

Although the foregoing examples have illustrated the effectiveness with which high molecular weight homopolymers of formaldehyde may be prepared using polyvalent metal chelates of β-diketones as formaldehyde polymerization initiators, the process of the invention is equally applicable to the copolymerization of formaldehyde (or its trimer, trioxane) with a copolymerizable monomer by contacting the comonomers with a reaction medium containing the polyvalent metal chelate.

I claim:

1. The process for producing high molecular weight polymers of formaldehyde which comprises polymerizing substantially anhydrous monomeric formaldehyde by bringing the monomer into contact with a reaction medium maintained at a temperature within the range from about −100° C. to about 80° C. and containing a formaldehyde polymerization initiator comprising from about 0.01 to about 50 percent by weight, based on the weight of the monomeric formaldehyde, of a polyvalent metal chelate of a β-diketone having a structure represented by the formula

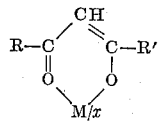

in which R and R' each represent a radical selected from the group consisting of lower alkyl groups, haloalkyl groups, aryl groups, aralkyl groups, and heterocyclic groups, M is a polyvalent metal, and $x$ is an integer representing the valence of the polyvalent metal.

2. The process for producing high molecular weight polymers of formaldehyde which comprises polymerizing substantially anhydrous monomeric formaldehyde by bringing the monomer into contact with a reaction medium maintained at a temperature within the range from about −100° C. to about 80° C. and containing a formaldehyde polymerization initiator comprising from about 0.01 to about 50 percent by weight, based on the weight of the monomeric formaldehyde, of a polyvalent metal acetylacetonate.

3. The process for producing high molecular weight polymers of formaldehyde which comprises polymerizing substantially anhydrous monomeric formaldehyde by bringing the monomer into contact with a reaction medium maintained at a temperature within the range from about 10° C. to about 60° C. and containing a formaldehyde polymerization initiator comprising from about 0.1 to about 5 percent by weight, based on the weight of the monomeric formaldehyde, of a polyvalent metal chelate of a β-diketone having a structure represented by the formula

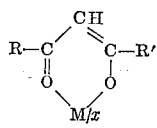

in which R and R' each represent a radical selected from the group consisting of lower alkyl groups, haloalkyl groups, aryl groups, aralkyl groups, and heterocyclic groups, M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal.

4. The process for producing high molecular weight polymers of formaldehyde which comprises polymerizing substantially anhydrous monomeric formaldehyde by bringing the monomer into contact with a reaction medium maintained at a temperature within the range from about −100° C. to about 80° C. and comprising (i) an alkylene dicarboxylate having a structure represented by the formula

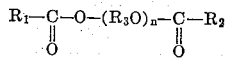

in which $R_1$ and $R_2$ each represent a monovalent radical selected from the group consisting of alkyl groups containing from 1 to 17 carbon atoms, cycloalkyl groups, and mononuclear and binuclear aryl groups, $R_3$ represents a divalent radical selected from the group consisting of —CH$_2$— and

and $n$ is an integer from 1 to 3, and (ii) from about 0.01 to about 50 percent by weight, based on the weight of monomeric formaldehyde introduced into the reaction medium, of a polyvalent metal chelate of a β-diketone having a structure represented by the formula

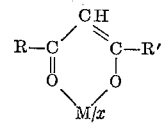

in which R and R' each represent a radical selected from the group consisting of lower alkyl groups, haloalkyl groups, aryl groups, aralkyl groups, and heterocyclic groups, M is is a polyvalent metal, and $x$ is an integer representing the valence of the polyvalent metal.

5. The process for producing high molecular weight polymers of formaldehyde which comprises polymerizing substantially anhydrous monomeric formaldehyde by bringing the monomer into contact with a reaction medium maintained at a temperature within the range from about 10° C. to about 60° C. and comprising (i) an alkylene dicarboxylate having a structure represented by the formula

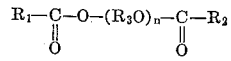

in which $R_1$ and $R_2$ each represent a monovalent radical selected from the group consisting of alkyl groups containing from 1 to 17 carbon atoms, cycloalkyl groups, and mononuclear and binuclear aryl groups, $R_3$ represents a divalent radical selected from the group consisting of —CH$_2$— and

and $n$ is an integer from 1 to 3, and (ii) from about 0.1 to about 5 percent by weight, based on the weight of monomeric formaldehyde introduced into the reaction medium, of a polyvalent metal chelate of a β-diketone having a structure represented by the formula

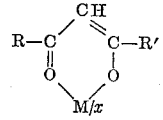

in which R and R' each represent a radical selected from the group consisting of lower alkyl groups, haloalkyl groups, aryl groups, aralkyl groups, and heterocyclic groups, M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal.

6. The process for producing high molecular weight polymers of formaldehyde which comprises polymerizing substantially anhydrous monomeric formaldehyde by bringing the monomer into contact with the reaction medium maintained at a temperature within the range from about 10° C. to about 60° C. and comprising methylene diacetate in which there is dissolved from about 0.1 to about 5 percent by weight, based on the weight of monomeric formaldehyde introduced into the reaction medium, of a polyvalent metal chelate of a β-diketone having a structure represented by the formula

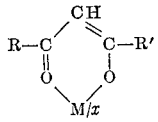

in which R and R' each represent a radical selected from the group consisting of lower alkyl groups, haloalkyl groups, aryl groups, aralkyl groups, and heterocyclic groups, M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal.

7. The process for producing high molecular weight polymers of formaldehyde which comprises polymerizing substantially anhydrous monomeric formaldehyde by bringing the monomer into contact with a reaction medium maintained at a temperature within the range from about 10° C. to about 60° C. and comprising (i) an alkylene dicarboxylate having a structure represented by the formula

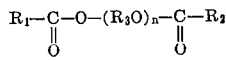

in which $R_1$ and $R_2$ each represent a monovalent radical selected from the group consisting of alkyl groups containing from 1 to 17 carbon atoms, cycloalkyl groups, and mononuclear and binuclear aryl groups, $R_3$ represents a divalent radical selected from the group consisting of —CH$_2$— and

and $n$ is an integer from 1 to 3, and (ii) from about 0.1 to about 5 percent by weight, based on the weight of monomeric formaldehyde introduced into the reaction medium, of a polyvalent metal acetylacetonate.

8. The process for producing high molecular weight polymers of formaldehyde which comprises polymerizing substantially anhydrous monomeric formaldehyde by bringing the monomer into contact with a reaction medium maintained at a temperature within the range from about 10° C. to about 60° C. and comprising (i) a methylene dicarboxylate having a structure represented by the formula

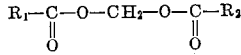

in which $R_1$ and $R_2$ each represent a monovalent radical selected from the group consisting of alkyl groups containing from 1 to 17 carbon atoms, cycloalkyl groups, and mononuclear and binuclear aryl groups, and (ii) from about 0.1 to about 5 percent by weight, based on the weight of monomeric formaldehyde introduced into the reaction medium, of a polyvalent metal acetylacetonate having a structure represented by the formula

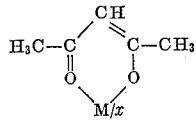

in which M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal.

9. The process for producing high molecular weight polymers of formaldehyde which comprises (a) polymerizing substantially anhydrous monomeric formaldehyde by bringing the monomer into contact with a reaction medium maintained at a temperature within the range from about —100° C. to about 80° C. and comprising (i) an alkylene dicarboxylate having a structure represented by the formula

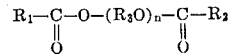

in which $R_1$ and $R_2$ each represent a monovalent radical selected from the group consisting of alkyl groups containing from 1 to 17 carbon atoms, cycloalkyl groups, and mononuclear and binuclear aryl groups, $R_3$ represents a divalent radical selected from the group consisting of —CH$_2$— and

and $n$ is an integer from 1 to 3, and (ii) from about 0.1 to about 5 percent by weight, based on the weight of monomeric formaldehyde introduced into the reaction medium, of a polyvalent metal chelate of a β-diketone having a structure represented by the formula

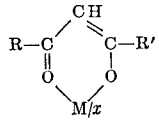

in which R and R' each represent a radical selected from the group consisting of lower alkyl groups, haloalkyl groups, aryl groups, aralkyl groups, and heterocyclic groups, M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal, thereby forming a suspension in the reaction medium of a high molecular weight, branched chain, partially esterified polyoxymethylene polyol, and (b) adding a catalytic amount of an alkaline esterification catalyst to the suspension and heating the resultant mixture to a temperature within the range from about 140° C. to about 200° C. to substantially completely esterify the polyoxymethylene polyol, thereby forming a high molecular weight branched chain polyoxymethylene polycarboxylate.

10. The process for producing high molecular weight polymers of formaldehyde which comprises (a) polymerizing substantially anhydrous monomeric formaldehyde by bringing the monomer into contact with a reaction medium maintained at a temperature within the range from about 10° C. to about 60° C. and comprising methylene diacetate in which there is dissolved from about 0.1 to about 5 percent by weight, based on the weight of monomeric formaldehyde introduced into the reaction medium, of a polyvalent metal chelate of a β-diketone having a structure represented by the formula

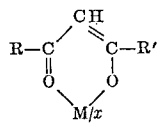

in which R and R' each represent a radical selected from the group consisting of lower alkyl groups, haloalkyl groups, aryl groups, aralkyl groups, and heterocyclic groups, M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal, thereby forming a suspension in the reaction medium of a high molecular weight, branched chain, partially acetylated polyoxymethylene polyol, and (b) adding a catalytic amount of an alkaline esterification catalyst to the suspension and heating the resultant mixture to a temperature within the range from about 160° C. to about 180° C. to substantially completely acetylate the partially acetylated polyoxymethylene polyol, thereby forming a high molecular weight branched chain polyoxymethylene polyacetate.

11. The process for producing branched chain polyoxymethylene polyacetates having a high molecular weight which comprises (a) polymerizing substantially anhydrous monomeric formaldehyde by bringing the monomer into contact with a reaction medium maintained at a temperature within the range from about 10° C. to about 60° C. and comprising methylene diacetate in which there is dissolved from about 0.1 to about 5 percent by weight, based on the weight of monomeric formaldehyde introduced into the reaction medium, of a polyvalent metal acetylacetonate having a structure represented by the formula

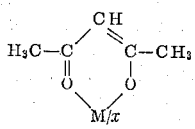

in which M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal, thereby forming a suspension in the reaction medium of a high molecular weight, branched chain, partially acetylated polyoxymethylene polyol, and (b) adding a catalytic amount of an alkaline esterification catalyst and at least a stoichiometric excess of acetic anhydride to the suspension and heating the resultant mixture to a temperature within the range from about 160° C. to about 180° C. to substantially completely acetylate the partially acetylated polyoxymethylene polyol, thereby forming a high molecular weight branched chain polyoxymethylene polyacetate.

12. A process for producing high molecular weight polymers of formaldehyde in accordance with claim 11, wherein the reaction medium comprises methylene diacetate in which there is dissolved from about 0.1 to about 5 percent by weight, based on the weight of the monomeric formaldehyde introduced into the reaction medium, of ferrous acetylacetonate.

13. A process for producing high molecular weight polymers of formaldehyde in accordance with claim 11, wherein the reaction medium comprises methylene diacetate in which there is dissolved from about 0.1 to about 5 percent by weight, based on the weight of the monomeric formaldehyde introduced into the reaction medium, of ferric acetylacetonate.

14. A process for producing high molecular weight polymers of formaldehyde in accordance with claim 11, wherein the reaction medium comprises methylene diacetate in which there is dissolved from about 0.1 to about 5 percent by weight, based on the weight of the monomeric formaldehyde introduced into the reaction medium, of zirconium acetylacetonate.

15. A process for producing high molecular weight polymers of formaldehyde in accordance with claim 11, wherein the reaction medium comprises methylene diacetate in which there is dissolved from about 0.1 to about 5 percent by weight, based on the weight of the monomeric formaldehyde introduced into the reaction medium, of zinc acetylacetonate.

16. A process for producing high molecular weight polymers of formaldehyde in accordance with claim 11, wherein the reaction medium comprises methylene diacetate in which there is dissolved from about 0.1 to about 5 percent by weight, based on the weight of the monomeric formaldehyde introduced into the reaction medium, of aluminum acetylacetonate.

17. The process for producing high molecular weight copolymers of formaldehyde which comprises copolymerizing substantially anhydrous monomeric formaldehyde and a copolymerizable monomer by bringing the comonomers into contact with a reaction medium maintained at a temperature within the range from about 10° C. to about 60° C. and comprising (i) an alkylene dicarboxylate having a structure represented by the formula

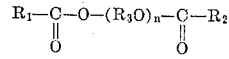

in which $R_1$ and $R_2$ each represent a monovalent radical selected from the group consisting of alkyl groups containing from 1 to 17 carbon atoms, cycloalkyl groups, and mononuclear and binuclear aryl groups, $R_3$ represents a divalent radical selected from the group consisting of —$CH_2$— and

and $n$ is an interger from 1 to 3, and (ii) from about 0.1 to about 5 percent by weight, based on the combined weight of the comonomers introduced into the reaction medium, of a polyvalent metal chelate of a β-diketone having a structure represented by the formula

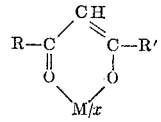

in which R and R' each represent a radical selected from the group consisting of lower alkyl groups, haloalkyl groups, aryl groups, aralkyl groups, and heterocyclic groups, M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal.

18. The process for producing high molecular weight copolymers of formaldehyde which comprises copolymerizing substantially anhydrous monomeric formaldehyde and a copolymerizable monomer by bringing the comonomers into contact with a reaction medium maintained at a temperature within the range from about 10° C. to about 60° C. and comprising (i) a methylene dicarboxylate having a structure represented by the formula

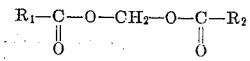

in which $R_1$ and $R_2$ each represent a monovalent radical selected from the group consisting of alkyl groups containing from 1 to 17 carbon atoms, cycloalkyl groups, and mononuclear and binuclear aryl groups, and (ii) from about 0.1 to about 5 percent by weight, based on the combined weight of the comonomers introduced into the reaction medium, of a polyvalent metal acetylacetonate having a structure represented by the formula

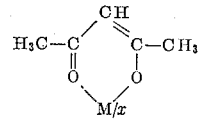

in which M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal.

19. A branched chain polyoxymethylene polyacetate comprising the reaction product formed by sequentially (1) polymerizing substantially anhydrous monomeric formaldehyde by bringing the monomer into contact with a reaction medium maintained at a temperature within the range from about 10° C. to about 60° C. and comprising methylene diacetate in which there is dissolved from about 0.1 to about 5 percent by weight, based on the weight of monomeric formaldehyde introduced into the reaction medium, of a polyvalent metal chelate of a β-diketone having a structure represented by the formula

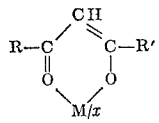

in which R and R' each represent a radical selected from the group consisting of lower alkyl groups, haloalkyl groups, aryl groups, aralkyl groups, and heterocyclic groups, M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal thereby forming a suspension in the reaction medium of a high molecular weight, branched chain, partially acetylated polyoxymethylene polyol, and (2) adding a catalytic amount of an alkaline esterification catalyst to the suspension and heating the resultant mixture to a temperature within the range from about 160° C. to about 180° C. to substantially completely acetylate the partially acetylated polyoxymethylene polyol, the branched chain polyoxymethylene polyacetate being characterized by (a) a viscosimetrically determined molecular weight in the range from about 10,000 to about 300,000, (b) a Sidi Number not less than 1.5 when computed in accordance with the formula $S_N = \overline{M}_V / \overline{M}_{IR}$, where $S_N$ represents the Sidi Number, $\overline{M}_V$ represents the viscosimetrically determined apparent molecular weight of the polymer, and $\overline{M}_{IR}$ represents the IR-spectrophotometrically determined molecular weight of the polymer calculated from the intensity of the carbonyl absorption band of the infrared absorption spectrum of the polymer and assuming for the purpose of such calculation that the intensity of such carbonyl absorption band is due to the presence of two carboxylate groups per molecule, and (c) a polyfunctional group in the molecular structure which is evidenced, upon acid hydrolysis of the polymer, by the presence of less than 1 percent by weight of a β-diketone having a structure represented by the formula

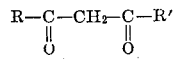

in which R and R' each represent a radical selected from the groups consisting of lower alkyl groups, haloalkyl groups, aryl groups, aralkyl groups, and heterocyclic groups.

20. A branched chain polyoxymethylene polyacetate comprising the reaction product formed by sequentially (1) polymerizing substantially anhydrous monomeric formaldehyde by bringing the monomer into contact with a reaction medium maintained at a temperature within the range from about 10° C. to about 60° C. and comprising methylene diacetate in which there is dissolved from about 0.1 to about 5 percent by weight, based on the weight of monomeric formaldehyde introduced into the reaction medium, of a polyvalent metal acetylacetonate having a structure represented by the formula

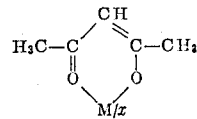

in which M is a polyvalent metal selected from the group consisting of iron, copper, zinc, aluminum, cobalt, chromium, cadmium, molybdenum, lead, magnesium, beryllium, nickel, thorium, indium, vanadium, titanium, and zirconium, and $x$ is an integer representing the valence of the polyvalent metal, thereby forming a suspension in the reaction medium of a high molecular weight, branched chain, partially acetylated polyoxymethylene polyol, and (2) adding a catalytic amount of an alkaline esterification catalyst and at least a stoichiometric excess of acetic anhydride to the suspension and heating the resultant mixture to a temperature within the range from about 160° C. to about 180° C. to substantially completely acetylate the partially acetylated polyoxymethylene polyol, the branched chain polyoxymethylene polyacetate being characterized by (a) a viscosimetrically determined molecular weight in the range from about 15,000 to about 60,000, (b) a Sidi Number not less than 1.5 when computed in accordance with the formula $S_N = \overline{M}_V / \overline{M}_{IR}$, where $S_N$ represents the Sidi Number, $\overline{M}_V$ represents the viscosimetrically determined apparent molecular weight of the polymer, and $\overline{M}_{IR}$ represents the IR-spectrophotometrically determined molecular weight of the polymer calculated from the intensity of the carbonyl absorption band of the infrared absorption spectrum of the polymer and assuming for the purpose of such calculation that the intensity of such carbonyl absorption band is due to the presence of two carboxylate groups per molecule, and (c) a polyfunctional group in the molecular structure which is evidenced, upon acid hydrolysis of the polymer, by the presence of from about 25 to about 400 parts per million of 2,4-pentanedione.

References Cited by the Examiner

UNITED STATES PATENTS

| | | | |
|---|---|---|---|
| 3,016,297 | 1/1962 | Mochel et al. | 260—64 |
| 3,111,503 | 11/1963 | O'Connor et al. | 260—67 |
| 3,216,972 | 11/1965 | Sidi | 260—67 |
| 3,219,630 | 11/1965 | Sidi | 260—67 |

OTHER REFERENCES

Kern et al., Angewandte Chemie, 73 No. 6, pp. 177–186 (March 1961) (pp. 183–186 relied on).

Kunststoffe, vol. 53, pp. 424–436 (July 1963), English translation, pp. 11–22.

WILLIAM H. SHORT, *Primary Examiner.*

SAMUEL H. BLECH, *Examiner.*

L. M. MILLER, *Assistant Examiner.*